H. F. POPE.
DRAFT AND BUFFING APPARATUS.
APPLICATION FILED SEPT. 24, 1908.
1,057,168.
Patented Mar. 25, 1913.
4 SHEETS—SHEET 1.
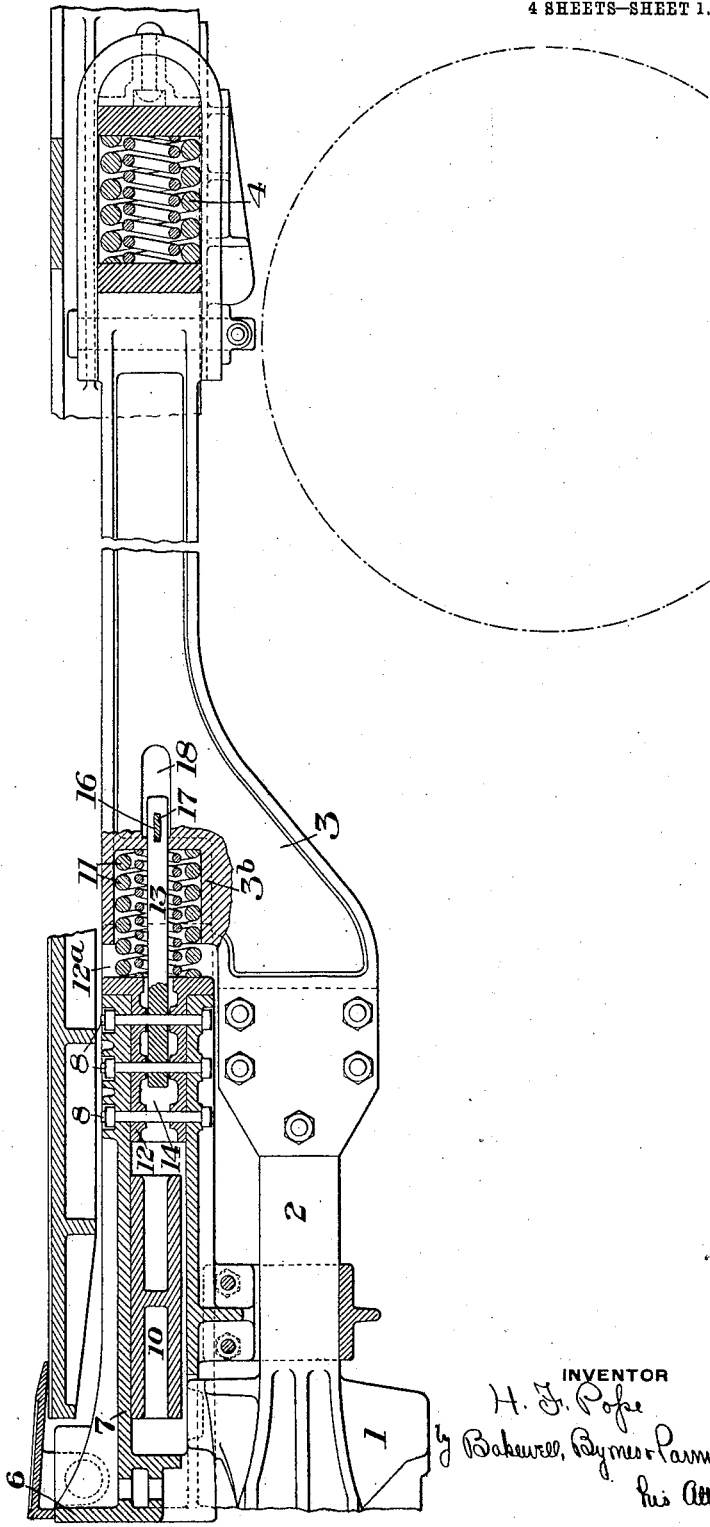
WITNESSES
R. A. Balderson
R. D. Little
INVENTOR
H. F. Pope
by Bakewell, Byrnes & Parmelee
his Attys H. F. POPE.
DRAFT AND BUFFING APPARATUS.
APPLICATION FILED SEPT. 24, 1908.
1,057,168.
Patented Mar. 25, 1913.
4 SHEETS—SHEET 2.
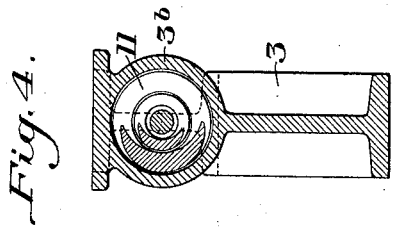
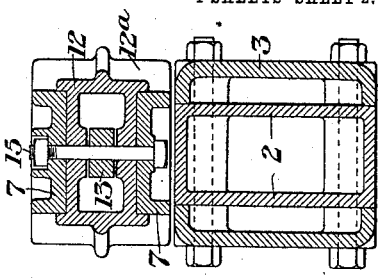
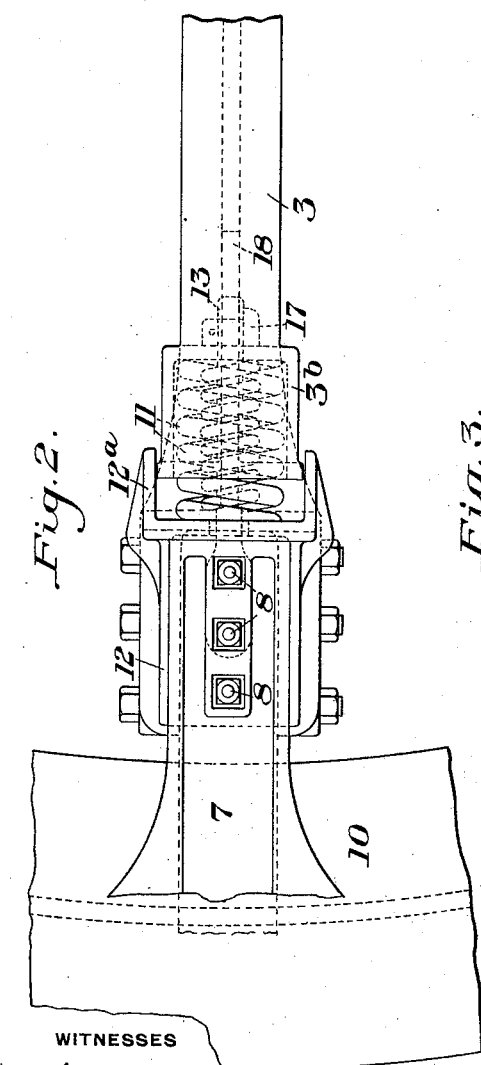
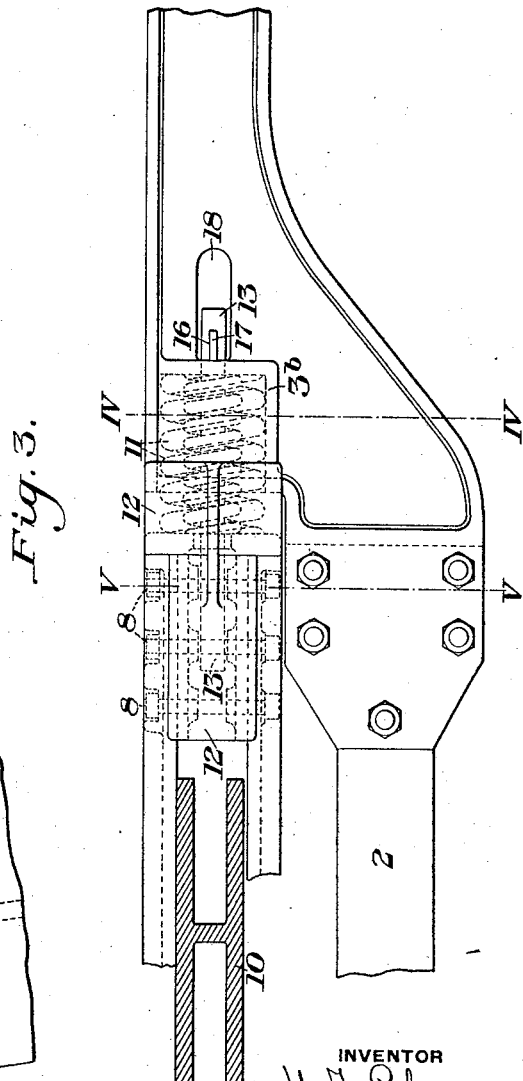
WITNESSES
INVENTOR
H. F. Pope,

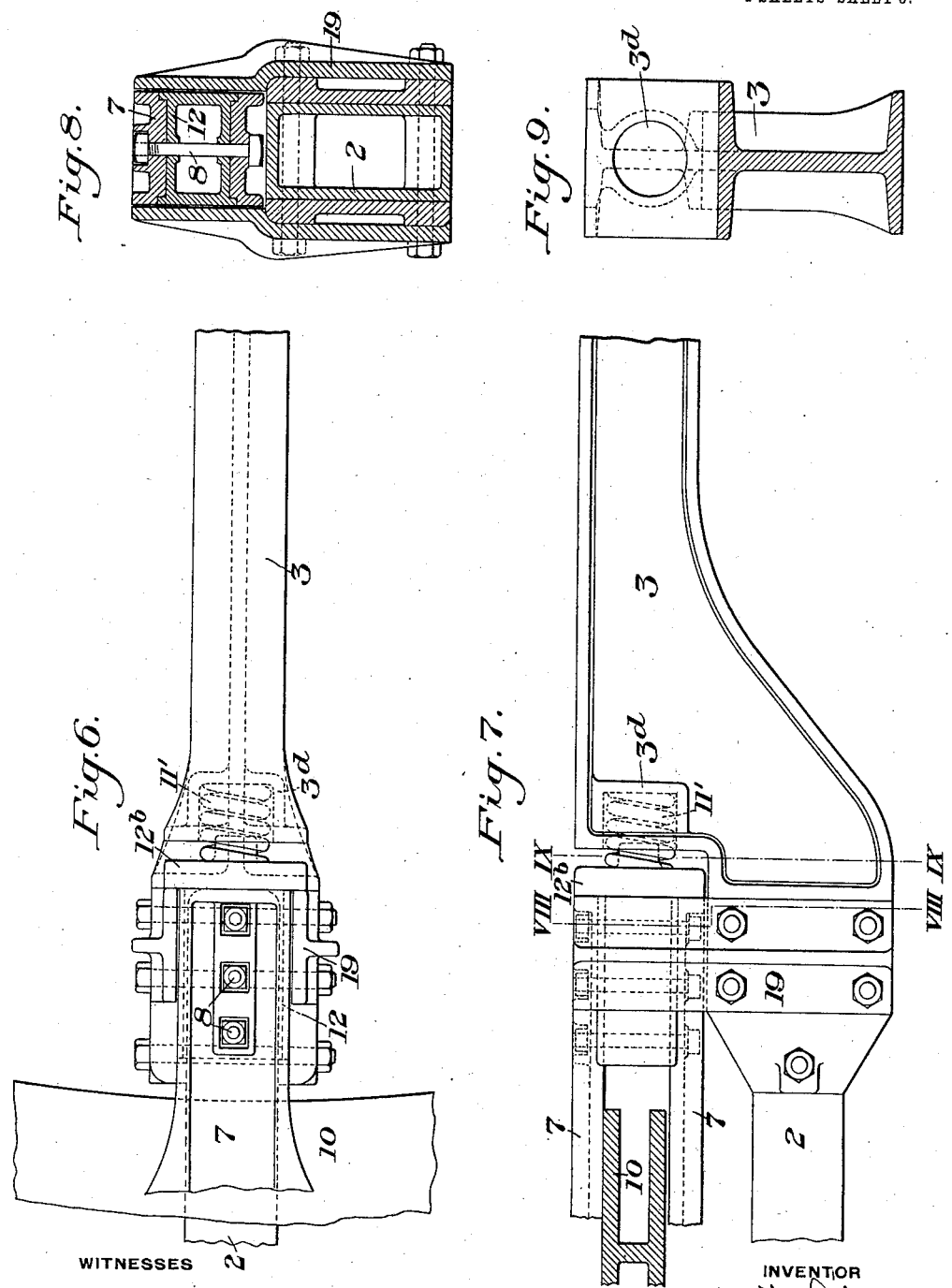

H. F. POPE.
DRAFT AND BUFFING APPARATUS.
APPLICATION FILED SEPT. 24, 1908.
1,057,168.
Patented Mar. 25, 1913.
4 SHEETS—SHEET 4.
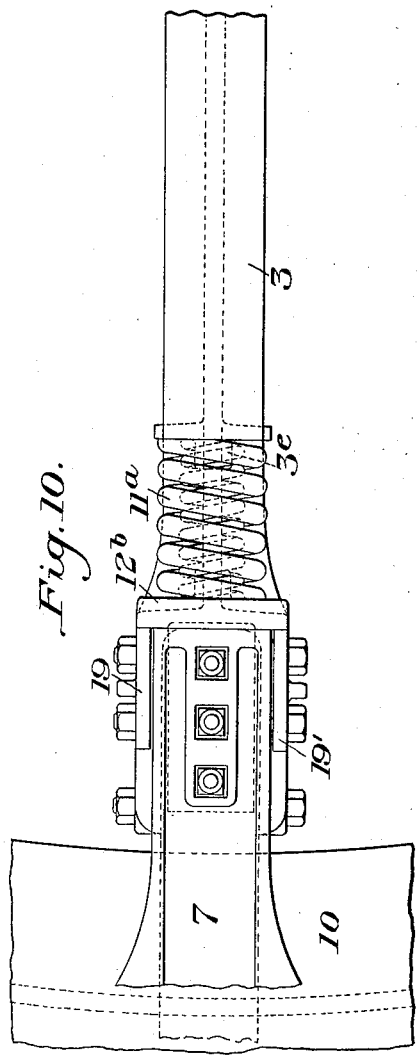
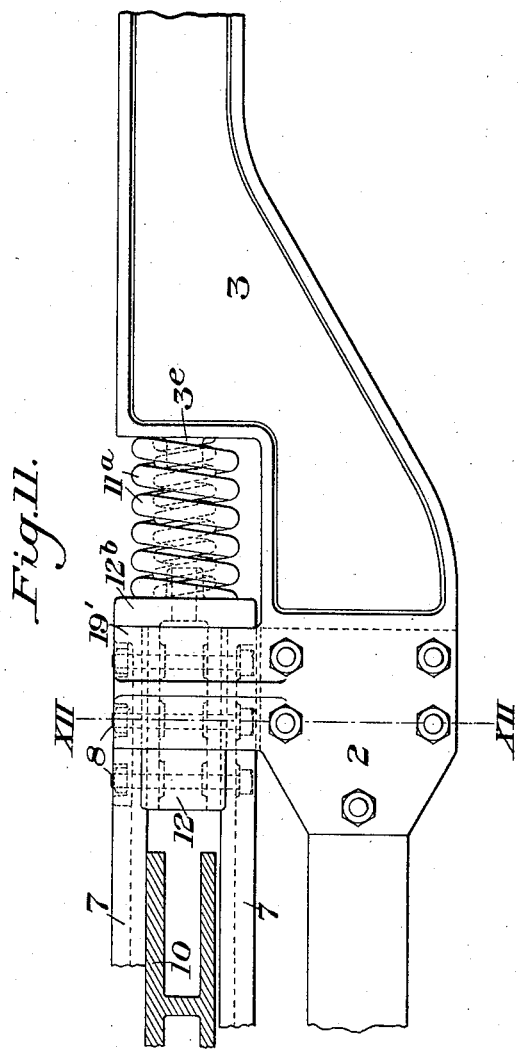
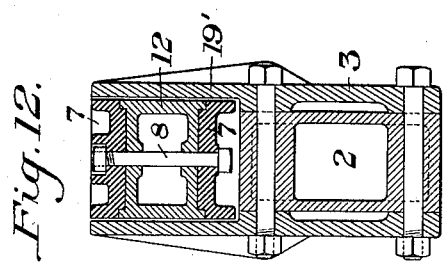
WITNESSES
INVENTOR

UNITED STATES PATENT OFFICE.

HENRY F. POPE, OF CLEVELAND, OHIO, ASSIGNOR TO THE NATIONAL MALLEABLE CASTINGS COMPANY, OF CLEVELAND, OHIO, A CORPORATION OF OHIO.

DRAFT AND BUFFING APPARATUS.

1,057,168. Specification of Letters Patent. Patented Mar. 25, 1913.

Original application filed June 2, 1908, Serial No. 436,187. Divided and this application filed September 24, 1908. Serial No. 454,597.

*To all whom it may concern:*

Be it known that I, HENRY F. POPE, a citizen of the United States, and a resident of Cleveland, Cuyahoga county, Ohio, have invented a new and useful Improvement in Draft and Buffing Apparatus, of which the following is a specification, reference being had to the accompanying drawings, in which—

Figure 1 is a sectional elevation, partly broken away, showing a preferred form of my draft and buffing apparatus; Fig. 2 is a partial plan view; Fig. 3 is a side elevation of the parts shown in Fig. 2; Figs. 4 and 5 are cross-sections on the lines IV—IV and V—V respectively of Fig. 3; Figs. 6 and 7 are views similar to Figs. 2 and 3, showing a modified construction; Figs. 8 and 9 are cross-sections on the lines VIII—VIII and IX—IX respectively of Fig. 7; Figs. 10 and 11 are views similar to Figs. 6 and 7, but showing a further modification; and Fig. 12 is a section on the line XII—XII of Fig. 11.

In the drawings, 1 is the coupler head having a shank 2 affixed to a rear extension 3, which extends rigidly from the coupler to its rear pivoted connection with the draft rigging 4, the draft rigging being mounted between the car sills so as to be adapted for longitudinal motion in buffing and draft, but being held from lateral swinging motion with the coupler.

6 is the transverse member of the buffer, having a shank 7 which is divided or forked longitudinally and is attached by vertical bolts 8 to a buffer shank filler block extension 12.

10 is the end sill of the platform, which acts as a carry iron for the buffer, passing for this purpose between the arms of its shank 7, being curved or segmental in form so as to present a forward curved buffing face for the transverse member 6 of the buffer when it reaches the rear limit of its buffing motion.

The coupler-shank extension 3 has a forwardly extending shoulder on which there is a barrel-shaped spring casing $3^b$ into which the buffing spring 11 is inserted.

A filler block 12 is placed between the rear ends of the divided buffer shank 7 so as to fill the space between the same, and this filler block has at its end lateral wings $12^a$ which fit against the sides of the spring casing $3^b$ and slide thereon in the forward and backward motion of the buffer. The buffer is retained in place by a tail bolt 13, which is attached within a recess 14 in the filler block 12 by means of the bolts 8, by which the filler block is fastened to the buffer shank. This tail bolt has at its rear end a slot 16 for the insertion of a key 17 which abuts against the rear wall of the spring casing and holds the tail bolt from forward movement. This tail bolt and key enables the buffer spring to be initially compressed in the spring casing. The rearward motion of the tail bolt is provided for by forming a slot 18 in the web of the coupler shank extension.

In the modification shown in Figs. 6 to 9, the buffer springs 11' are placed in a barrel-shaped casing $3^d$ formed on a shoulder on the coupler shank extension 3, but the buffer shank is guided and held between vertical plates 19 which extend upwardly from the coupler shank extension, thus rendering unnecessary the use of the wings $12^a$ on the filler block 12 described with reference to the other figures of the drawings. The buffer filler block 12 in this case is formed at its rear end with a spring seat and thimble $12^b$, which abuts against and holds the spring 11', and shoulders at the rear end of the filler-block 12 abut against the rear of the plates 19 and prevent forward withdrawal of the buffer. In this case the function of the spring 11' is to press the buffer forwardly against the opposing buffer of another car, and for this reason its resisting capacity need not be great. The buffing stresses are communicated from the rear end of the buffer to the coupler shank extension 3, when the buffer spring 11' is fully compressed.

In the modification shown in Figs. 10, 11 and 12, the plates 19 are replaced by upwardly projecting integral shoulders 19' which extends from the coupling shank extension 2. In this form of the invention I omit the spring casing and employ instead thereof a thimble $3^e$ which supports the end of the spring $11^a$. The buffer spring shown in this case is the ordinary double coil spring, substituted for the lighter spring 11' above described.

In Fig. 1, I have shown the buffer as having a depending stirrup or carry-iron through which the coupler shank 2 extends.

This stirrup of carry-iron not only forms a support for the coupler and its shank but it provides means for causing the buffer and coupler to swing laterally in unison.

Within the scope of my invention as described in the claims, modifications may be made by those skilled in the art, since

What I claim is:—

1. A radially swinging pivoted coupler and coupler shank extension, a draft rigging to which said extension is pivoted, a buffer mounted for longitudinal movement, and a buffer spring interposed between the buffer and the main body of the coupler shank extension and seating upon said main body at its rear end, that portion of the body of the coupler shank extension which lies between the buffer spring and the draft rigging being in longitudinal alinement with said spring and rigging; substantially as described.

2. A radially swinging pivoted coupler and coupler shank extension, a draft rigging to which said extension is pivoted, a buffer mounted for longitudinal movement, and a buffer spring interposed between the buffer and the main body of the coupler shank extension and seating upon said main body at its rear end, said main body having a pocket therein to receive said spring, that portion of the body of the coupler shank extension which lies between the buffer spring and the draft rigging being in longitudinal alinement with said spring and rigging; substantially as described.

3. A radially swinging pivoted coupler and coupler shank extension, a draft rigging to which said extension is pivoted, a buffer mounted for longitudinal movement, and a buffer spring interposed between the buffer and the main body of the coupler shank extension and seating upon said main body at its rear end, that portion of the body of the coupler shank extension which lies between the buffer spring and the draft rigging being in longitudinal alinement with said spring and rigging, and its forward portion being offset downwardly, the buffer spring extending back as far, at least, as the offset in said extension; substantially as described.

4. A radially swinging pivoted coupler and coupler shank extension, a draft rigging to which said shank extension is pivoted, a buffer mounted for longitudinal movement, and a buffer spring interposed between the coupler shank extension and the buffer, that portion of the coupler shank extension which lies between the buffer spring and the draft rigging being in longitudinal alinement with said spring and rigging, and the buffer having a tail bolt extending rearwardly into engagement with the last named portion of said extension; substantially as described.

5. In a railway car draft and buffing appliance, the combination of a draft gear, a coupler extension capable of swinging relatively thereto, a buffer above the forward portion of said extension and having a telescoping connection with said extension, and a buffer spring interposed between said buffer and extension.

6. In a railway car draft and buffing appliance, the combination of a draft gear, a coupler extension pivoted thereto, a buffer coöperating with said extension and disposed above the front portion thereof one of said coöperating parts having a spring pocket, and a buffer spring in said pocket and interposed between said buffer and extension.

7. In a railway car draft and buffing appliance, the combination of a draft gear, a coupler extension pivoted thereto having an upper rear portion and a lower portion, a buffer above said lower portion of the extension, a spring interposed between said buffer and the rear portion of said extension, and means to limit the outward shifting of said buffer.

8. In a railway car draft and buffing appliance, the combination of a draft rigging, a coupler extension pivoted to said draft-rigging, a buffer mounted for longitudinal movement, and a buffer spring interposed between said coupler extension and buffer, that portion of the coupler extension which lies between the buffer spring and the draft rigging being in substantial longitudinal alinement with said spring and rigging.

9. In a railway car draft and buffing appliance, the combination of a draft rigging, a coupler extension pivoted thereto, a longitudinally shiftable buffer above the forward portion of said extension and adapted to transmit its shocks to said extension, a buffer spring interposed between said buffer and said extension, and a support for the forward end of said extension to permit lateral shifting of the same.

10. In a railway car draft and buffing appliance, the combination of a draft gear, a coupler extension pivoted thereto, a longitudinally shiftable buffer above the forward portion of said extension, a buffer spring interposed between said buffer and said extension, and means permitting independent longitudinal movement of said buffer and extension, and compelling substantially simultaneous lateral shifting of said extension and buffer.

11. A radially swinging pivoted coupler and coupler shank extension extending rigidly from the coupler to the pivotal joint, a draft rigging to which said extension is pivoted, a buffer mounted for longitudinal movement, and a buffer spring interposed between the coupler shank extension and the buffer, that portion of the coupler shank extension which lies between the buffer spring and the draft rigging being in longitudinal alinement with said spring and rigging.

12. A radially swinging pivoted coupler and coupler shank extension, a draft rigging to which said extension is pivoted, a buffer mounted for longitudinal movement and having its transverse head rigid with its shank, and a buffer spring interposed between the coupler shank extension and the buffer, that portion of the coupler shank extension which lies between the buffer spring and the draft rigging being in longitudinal alinement with said spring and rigging.

13. A radially swinging coupler and coupler shank extension with a shoulder thereon adapted to receive a buffer spring and to take the impact of buffing, a draft rigging to which said extension is pivotally connected, a buffer mounted for longitudinal movement and engaged with the shoulder, and a buffer spring interposed between the shoulder and the buffer, the shouldered portion of the shank extension being in longitudinal alinement with the buffer spring and shank extension.

14. A radially swinging pivoted coupler and coupler shank extension, a spring rigging to which the shank extension is pivoted, a buffer mounted for longitudinal movement, a buffer spring interposed between the coupler shank extension and the buffer, and a stop on the coupler shank extension against which the buffer shank is normally pressed by the buffer spring, that portion of the shank extension that is between the buffer spring and the spring rigging being in longitudinal alinement with said members.

In testimony whereof, I have hereunto set my hand.

HENRY F. POPE.

Witnesses:
HARRY E. OU,
O. W. LOOMIS.

---

Copies of this patent may be obtained for five cents each, by addressing the "Commissioner of Patents, Washington, D. C."